US006603717B1

United States Patent
Kawada et al.

(10) Patent No.: US 6,603,717 B1
(45) Date of Patent: Aug. 5, 2003

(54) OPTICAL DISK REPRODUCING DEVICE WITH AUTOMATIC FOCUS CONTROL LOOP

(75) Inventors: Yuichi Kawada, Kyoto (JP); Hiroshi Oyabu, Kyoto (JP)

(73) Assignee: Rohm Co., Ltd., Ukyo-Ku (JP)

( * ) Notice: Subject to any disclaimer, the term of this patent is extended or adjusted under 35 U.S.C. 154(b) by 0 days.

(21) Appl. No.: 09/560,894

(22) Filed: Apr. 28, 2000

(30) Foreign Application Priority Data

Apr. 30, 1999 (JP) .......................................... 11-123809

(51) Int. Cl.$^7$ .............................................. G11B 7/095
(52) U.S. Cl. .................................. 369/44.29; 369/53.28
(58) Field of Search ........................... 369/44.25, 44.27, 369/44.29, 53.28, 44.32, 53.18

(56) References Cited

U.S. PATENT DOCUMENTS

| 4,683,560 | A | * | 7/1987 | Takeuchi et al. | ......... 369/44.25 |
| 4,866,690 | A | * | 9/1989 | Tamaru et al. | ................. 369/14 |
| 5,912,867 | A | * | 6/1999 | Miyazono | ................. 369/44.27 |
| 6,052,344 | A | * | 4/2000 | Ueki | ........................ 369/44.27 |
| 6,154,425 | A | * | 11/2000 | Iida et al. | ................. 369/44.29 |

\* cited by examiner

Primary Examiner—W. R. Young
(74) Attorney, Agent, or Firm—Mattingly, Stanger & Malur, P.C.

(57) ABSTRACT

In an optical disk reproducing device, through a provision of a control circuit, movement of focus point of laser beams is set at positions ahead or back to the focus position causing to enter into an automatic focus control loop, and a retry search signal for searching the focusing position is caused to be generated by the search signal generation means, thereby, a refocusing control in case when an automatic focusing servo loop can not be maintained can be started from the positions ahead or back to the focus position causing to enter into the automatic focus control loop.

8 Claims, 3 Drawing Sheets

OPTICAL DISK REPRODUCING DEVICE WITH AUTOMATIC FOCUS CONTROL LOOP

BACKGROUND OF THE INVENTION

1. Field of the Invention

The present invention relates to an optical disk reproducing device, and, more specifically, relates to an optical disk reproducing device which permits to restore in a short time from an out of focus servo to a focus servo condition.

2. Conventional Art

Recently, with regard to CD-ROM devices, the data read out speed thereof is rapidly increasing, for example, from a double speed to 32 times speed or more than that speed, for this reason, it is required to read data in a speed range from double speed to 32 times speed or more that speed. Further, also with regard to optical disk memory devices, the memory density thereof is rapidly increasing, for example, to double, four times, six times, eight times and so on.

For these sorts of the optical disk reproducing devices, a focusing servo mechanism with a very high accuracy is required.

A focus servo device in a CD reproducing device receives reflection beams from a CD by a tetra-section photo detector (pick-up) in a pick-up unit and generates, through a focus position error generation circuit, RF detection signals representing detection signals of total optical beam amount received at the respective optical beam receiving areas (which are detection signals representing an optical beam amount received by the photo detector of the reflection beams from the optical disk, in other words, signals representing reflection level of the reflection beams from the optical disk, and hereinbelow are called as RF detection signals) and a position error detection signal FE (FE is an abbreviation of Focus Error) representing a detection signal determined by a mutual difference of the respective sums of detection signals of the opposing optical beam receiving areas.

Then, through level detection of the position error detection signal FE or the RF detection signals it is detected whether the operation enters into a just focus control range. When the position error detection signal FE or the RF detection signal reaches a just focus control level, in case of an analogue control, a focus servo loop is formed which includes a pick-up unit, an amplifier (or a gain adjusting use amplifier) in the focus position error generation circuit, a servo filter and a focus position adjusting mechanism (lens moving mechanism) in the pick-up unit, and the loop is automatically controlled so that the position error detection signal FE is rendered to be zero, thereby, a focusing of the laser beams outputted from the pick-up unit is performed so that the irradiation surface of the optical disk assumes a focusing position of the laser beams. Such focusing is performed, for example, by moving a lens disposed in an optical path for laser beams in the focus position adjusting mechanism into a focusing position.

Like operation is performed in case of a digital control, in that in the digital control processings corresponding to the functions of the respective circuits as has been explained above in connection with the analogue control are realized by executing predetermined corresponding programs through a MPU. Therein, a signal value which renders the position error detection signal FE to zero is calculated, the calculated error correction value is converted into an analogue value via a D/A converter and sends out the analogue signal, which is converted so as to focus the laser beams onto the irradiation surface of the optical disk, to the focus position adjusting mechanism as a driving signal.

FIG. 3 is a block diagram for explaining such sort of a conventional focus servo device.

In FIG. 3, numeral 1 is a focus servo device, numeral 2 is an optical disk therefor (illustration of which rotation mechanism is omitted), numeral 3 is a pick-up unit which includes a tetra-section photo detector (pick-up), a laser beam source, a lens disposed in an optical path of the laser beams and a focus position adjusting mechanism for moving the lens in back and forth direction, and through the movement of the lens a focusing position of the laser beams outputted from the laser beam source is moved in back and forth direction with respect to the optical disk 2.

Numeral 4 is a driver, when a drive signal is received, the driver 4 moves the lens in the focus position adjusting mechanism in back and forth direction.

Numeral 5 is an RF amplifier which includes inside thereof a focus position error generation circuit, receives a detection signal from the tetra-section photo detector (pick-up) in the pick-up unit 3 and outputs the RF detection signal and the position error detection signal FE.

Numeral 6 is a just focus detection circuit which receives clocks CLK from a clock circuit 11 and the position error detection signal FE with respect to a focus point, detects in synchronism with the clocks CLK the zero crossing point of the position error detection signal FE as well as detects whether the level of the position error detection signal FE is in a predetermined range (which corresponds to a focus position covered by the automatic focus control loop) with reference to the zero crossing point to detect a just focus position and sends out a detection signal Dj to a focus controller 7. The just focus detection circuit 6 continuously generates the detection signal Dj so long as the level of the position error detection signal FE at this moment is kept at the above predetermined range.

The focus controller 7 receives the clocks CLK from the clock generation circuit 11 and the just focus position detection signal Dj, generates in synchronism with the clocks CLK a control signal LOOPON representing a servo loop on signal and outputs the same to a change-over circuit 9 to change over to the side A of servo control (the condition as illustrated). Thereby, the focus servo device 1 enters into an automatic focus control loop (just focus control). Further, the focus controller 7 continuously generates the control signal LOOPON during when the just focus position detection signal Dj is received and when no just focus position detection signal Dj is received, the generation of the control signal LOOPON is stopped. When no control signal LOOPON is generated, the change-over circuit 9 is changed over to the side B of focus search. Further, at this instance, the focus controller 7 sends out a control signal SS to a search signal generation circuit 8 to operate the same.

A servo filter circuit 10 receives the position error detection signal FE from the RF amplifier 5, performs a servo filter processing (which is a processing performed through a phase compensation filter, usually a loop filter is used therefor) for correcting a position error with respect to focusing, sends out the output to the change-over circuit 9 and outputs the same via the side A of servo control to the driver 4. As a result, a servo loop for the automatic focus control is formed with the pick-up unit 3, and the laser beams are focused onto the irradiation face of the optical disk 2.

Numeral 8 is the search signal generation circuit which is constituted by an up and down counter 81 and a D/A converter 82 and is operated by the control signal SS from the focus controller 7, wherein the up and down counter 81 counts the clocks CLK from the clock generation circuit 11 and the D/A converter 82 converts the count value into an analogue value to generate a ramp voltage. The generated ramp voltage is applied to the change-over circuit 9 and then applied to the driver 4 via the side B of focus search. Thereby, the focus position of the laser beams irradiated from the pick-up unit 3 onto the face of the optical disk 2 is continuously moved in backward or forward.

As an overall operation of the device, at first the change over circuit 9 is set to the side B of focus search by the focus controller 7, and the focus controller 7 activates with the control signal SS the search signal generation circuit 8 which generates the ramp voltage and drives the driver 4. Thereby, the driver 4 drives the focus position adjusting mechanism in the pick-up unit 3 depending on the ramp voltage to move the lens. As a result, the focusing position of the laser beams irradiated from the laser beam source onto the optical disk 2 rises from the lowest point. Thereafter, at the moment when the just focus position is detected by the just focus detection circuit 6 receiving the position error detection signal FE, the focus controller 7 generates the control signal LOOPON to change-over the change-over circuit 9 to the side A of servo control. As a result, the automatic focusing servo loop is formed by the pick-up unit 3, the RF amplifier 5, the servo filter circuit 10 and the driver 4, thereby, the laser beams outputted from the pick-up unit 3 are focused onto the irradiation face of the optical disk 2.

Now, during the conventional focus control as has been explained above, if the device is subjected to such as external vibration, the optical beam receiving position of the tetra-section photo detection is shifted and the level of the position error detection signal FE outputted from the pick-up unit 3 varies, thereby, the automatic focusing servo loop can not be maintained. When the maintenance of the automatic focusing servo loop is failed, another focusing control is again required.

FIG. 4 is a diagram for explaining this focusing control.

The ordinate is a movement range of a focus of laser beams outputted from the pick-up unit 3 for the optical disk 2 and the abscissa is time t.

Period (1) is a period during which a first focusing search is performed. Thereafter, when the detection signal Dj is generated and the focus of the laser beams reaches the position J (focusing position) of the just focus detection point, the automatic focusing servo loop is formed to maintain the position (focusing position), which represents period (2). During this period the detection signal Dj is continuously generated from the just focus detection circuit 6.

Herein, if the device is subjected to such as an external vibration, the optical beam receiving position of the tetra-section photo detector is shifted to move out from the automatic focusing servo loop. If the control goes out from the automatic focusing servo loop, the detection signal Dj is stopped and the output LOOPON of the focus controller 7 is stopped. Accordingly, another focus search is performed of which period corresponds to period (3). Then, an automatic focusing servo loop is again formed and a focus of the laser beams is maintained on the focusing position which corresponds to period (4).

In this instance, every time when the control moves out from an automatic focusing servo loop, the focus search is repeated. For this reason, once the control moves out from an automatic focusing servo loop, it takes time as experienced in the first time to return to the original focus condition. Moreover, if the position J (focusing position) of the just focus detection point can not be detected, the movement of the focus of the laser beams is repeated over a range between the lower most value and the upper most value which further requires time.

SUMMARY OF THE INVENTION

An object of the present invention is to resolve these conventional art problems and to provide an optical disk reproducing device which permits to restore in a short time from an out of focus servo to a focus servo condition.

An optical disk reproducing device according to the present invention which achieves the above object and which includes a laser beam source which irradiates laser beams onto an optical disk, a photo detector which receives the reflection beams from the optical disk and generates a position error detection signal with respect to a focus position error for the optical disk, a detection circuit which receives the position error detection signal and detects a focus position of the laser beam locating in a range of an automatic focus control loop, and a focus servo device which changes over to the automatic focus control loop in response to the detection signal of the detection circuit and performs an automatic focusing of the laser beams for the optical disk in response to the position error detecting signal, is characterized in that, the optical disk reproducing device further comprises a driver which controls the focus position of the laser beams in response to a driving signal, a search signal generation means which generates as the driving signal a search signal which continuously advances or backs the focus position of the laser beams with respect to the optical disk, a memory means which stores the focus position of the laser beams at the moment in response to the detection signal from the detection circuit or a signal output value of the search signal generation means corresponding to the focus position, a first control circuit which causes the search signal generation means to generate as a retry search signal a drive signal which moves the focus of the laser beams from positions ahead or back to the focus position toward the focus position based on the focus position of the laser beams stored in the memory means or the signal output value stored in the memory means, and a second control circuit which operates the first control circuit while releasing the automatic focus control loop when the detection signal from the detection circuit is stopped or when the detection signal with respect to the position error moves out from the focus position.

As has been explained above, the movement of the focus of the laser beams by the first control circuit is set at positions ahead or back to the focus position causing to enter into the automatic focus control loop, and the retry search signal for searching a focusing position is generated by the search signal gene/ration means, thereby, a refocusing control in case when an automatic focusing servo loop can not be maintained can be started from the positions ahead or back to the focus position causing to enter into the automatic focus control loop.

As a result, the control can immediately enter into the automatic focus control loop and can restore in a short time from an out of focus servo to a focus servo condition.

DETAILED DESCRIPTION OF THE PREFERRED EMBODIMENT

Figure 1:
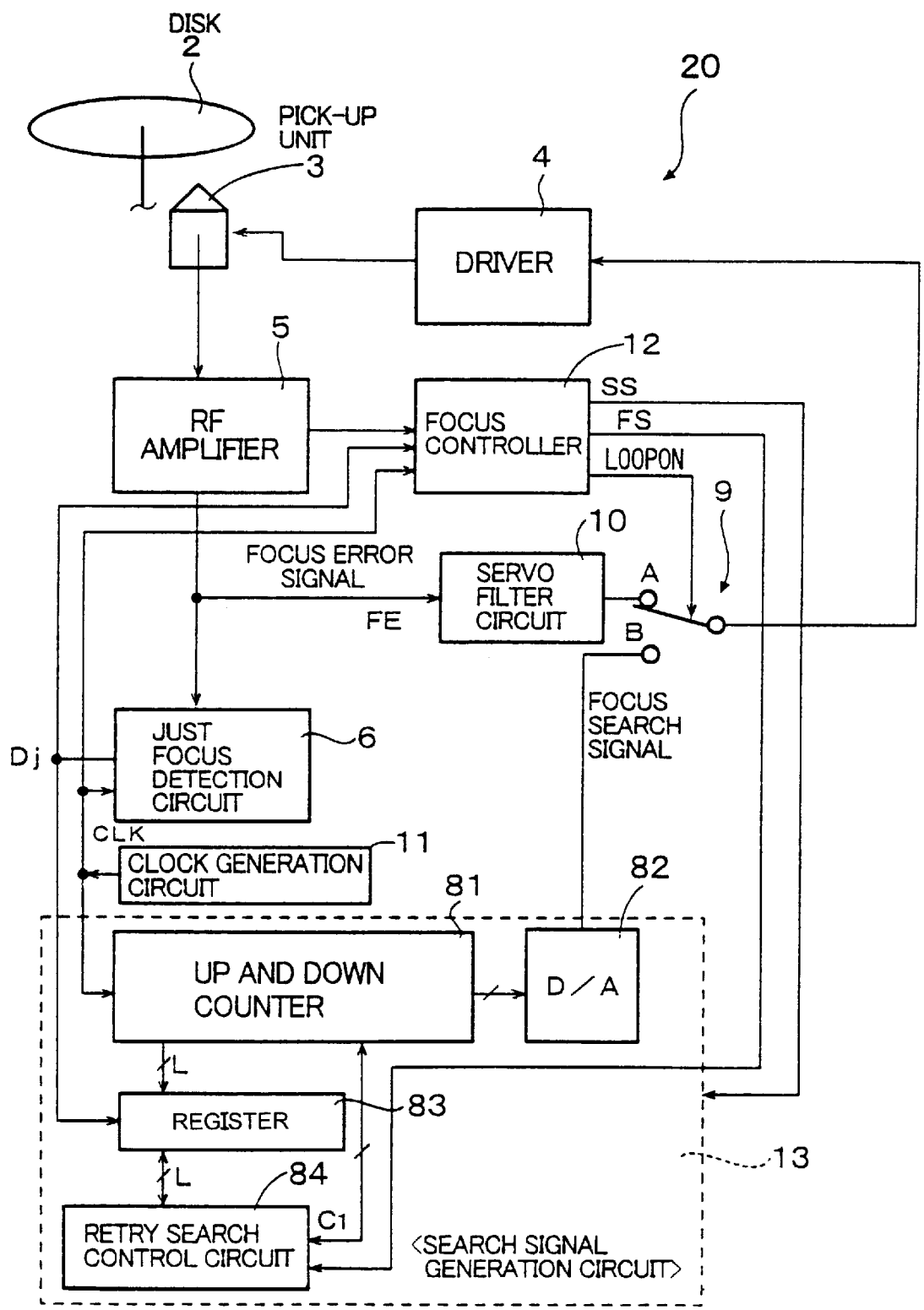
FIG. 1 is a block diagram for explaining a focus servo device in an optical disk reproducing device to which an optical disk reproducing device according to the present invention is applied.
Figure 2:
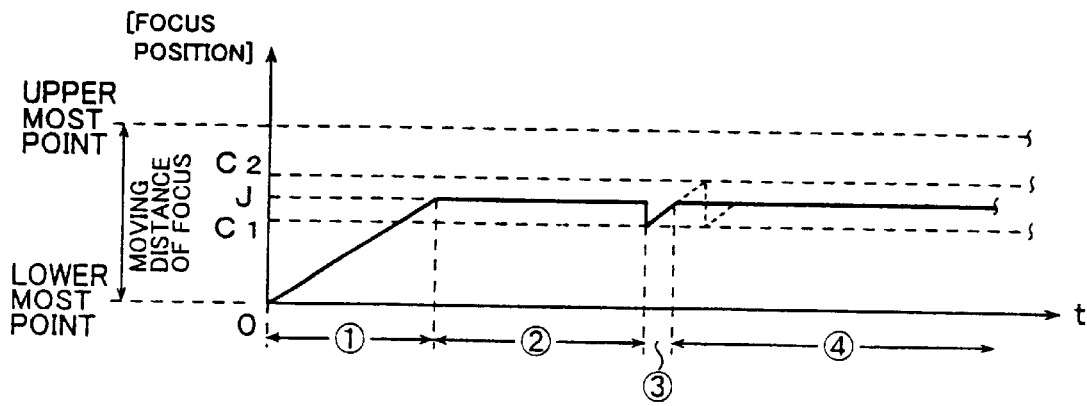
FIG. 2 is a diagram for explaining the focus servo operation in FIG. 1.
Figure 4:
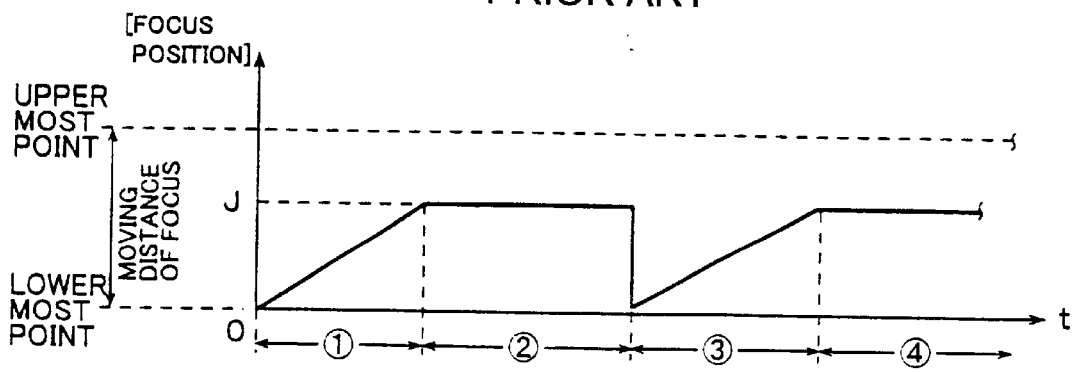
FIG. 4 is a view for explaining the focus servo operation in FIG. 3.
Figure 3:
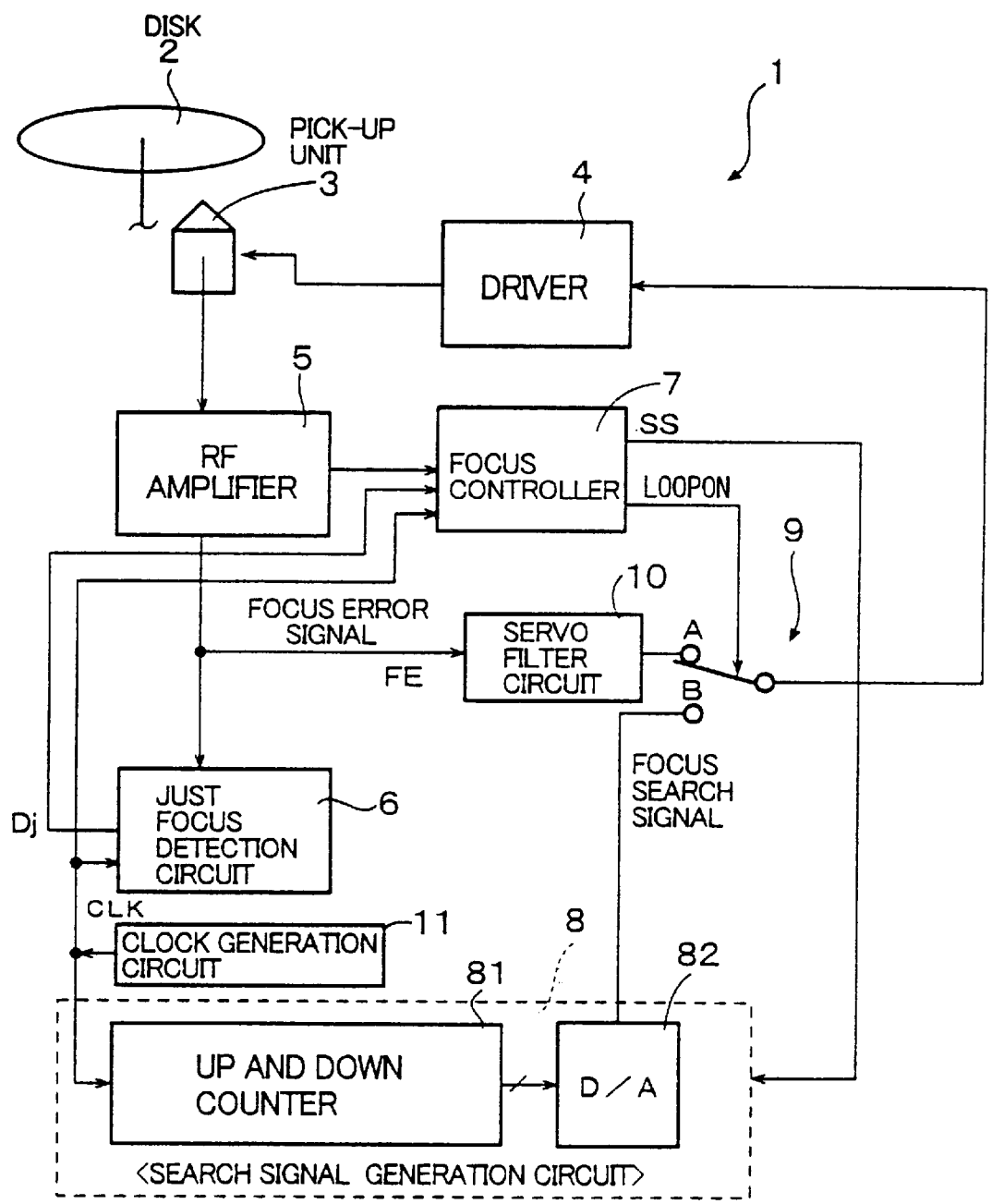
FIG. 3 is a block diagram for explaining a focus servo device in a conventional optical disk reproducing device.

In FIGS. 1 and 2, the same constitutional elements as has been explained in connection with FIGS. 3 and 4 are designated by the same reference numerals, and their explanation is omitted.

In a focus servo device 20 in FIG. 1, the focus controller 7 in the focus servo device 1 in FIG. 3 is replaced by a focus controller 12, and the search signal generating circuit 8 is replaced by a search signal generating circuit 13.

The focus controller 12 generates further a control signal FS in addition to the control signal LOOPON and the control signals SS in the focus controller 7. The control signal FS is generated when the just focus detection signal Dj of the just focus detection circuit 6 is generated and thereafter stopped, namely, the detection signal Dj once rises and thereafter falls (at the trailing edge). Further, as has been explained in connection with the conventional art, the range in which the detection signal Dj is generated includes a zero crossing point of the position error detection signal FE and a predetermined level range with reference to the zero crossing point, and at the time when the focus position of the laser beams is in the range of the automatic focus control loop.

Further, the search signal generation circuit 13, in addition to the up and down counter 81 and the D/A converting circuit 82, further includes a register 83 which stores the level of the drive signal for the just focus position and a retry search control circuit 84.

The search signal generation circuit 13 generates a signal of search waveform like the search signal generation circuit 8 as well as receives the just focus detection signal of the just focus detection circuit 6 and stores at the rising timing (leading edge) thereof an instant value (the value corresponding to the focus position causing to enter into the automatic focus control loop) of the up and down counter 81 in the register 83. Thereafter, when the control signal FS from the focus controller 12 is received, the retry search control circuit 84 is operated.

The retry search control circuit 84 reads out from the register 83 the level L (which corresponds to the focus position causing to enter into the automatic focus control loop) of the drive signal which corresponds to the previous just focus position, calculate a count range C1(=L−α)∼C2 (=L+β) with reference to the read out level and sets a start count value C1 (see FIG. 2) at the up and down counter 81. Then, the up and down counter 81 is caused to count (count up) the clocks CLK, analogue drive signals are outputted from the D/A converter 82 to the driver 4, the count value of the up and down counter 81 is monitored and when the count value reaches C2 (see FIG. 2), the count value is again set at C1 and the up and down counter 81 is caused to count clocks CLK. Thereby, the search signal generation circuit 13 can generate a retry search signal which limits the movement range of the focus of the laser beams at positions ahead or back to the just focus position J.

Herein, the count value C1 represents forward focusing position of the laser beams with respect to the first and previous just focus position J, and the count value C2 represents a backward focus position of the laser beams with respect to the first and previous just focus position J.

Now, in the above instance, the count value C2 can be set as the initial value at the up and down counter 81 and the set value can be count down depending on the clocks CLK. Namely, it will be sufficient, if the control is performed to move toward the just focus position J from either levels.

Further, the count range C1–C2 is selected in response to an actual out of control range and is preferable to be selected of proper values through actual measurement.

A focusing control in the focusing servo device 20 will be explained with reference to FIG. 2 which corresponds to FIG. 4.

The ordinate in FIG. 2 is a movement range of a focus of laser beams outputted from the pick-up unit 3 for the optical disk 2 and the abscissa is time t.

Period (1) is a period during which a first focusing search is performed. Thereafter, when the detection signal Dj is generated and the focus of the laser beams reaches the position J of the just focus detection point, the automatic focusing servo loop is formed to maintain the position, which represents period (2). During this period the detection signal Dj is continuously generated from the just focus detection circuit 6. Further, at this instance, the detection signal Dj is received from the just focus detection circuit 6 and with the rising timing (leading edge) thereof the value L of the up and down counter 81 is stored in the register 83.

Herein, if the device is subjected to such as an external vibration, the optical beam receiving position of the tetra-section photo detector is shifted to move out from the automatic focusing servo loop. If the control goes out from the automatic focusing servo loop, the detection signal Dj is stopped and the control signal FS is generated. Through the stop of the output LOOPON of the focus controller 7, another focus search is performed of which period corresponds to period (3) and which is shorter than the period (3) in FIG. 4.

Herein, if the just focus position J can not be detected by the retry focus search of one time, the search is repeated in the range C1–C2.

As a result, the just focus position J can be restored with a shorter time than that in the conventional device, in this connection, with the conventional device the focus of the laser beams is repeatedly moved between the lower most value∼upper most value which requires much time.

As has been explained hitherto, although the present embodiment is primarily explained through the analogue processings, the focus control can be performed by realizing the respective circuit functions in the present embodiment through program execution by a MPU in which the programs are incorporated inside the focus controller 7 and the position error detection signals FE are A/D converted. In this instance, in particular, the register 81, the retry search control circuit 84 and the focus controller 12 can be realized through a program processing as if one control circuit, for example, such as with one arithmetic processing unit.

Further, in the present embodiment, the focus position of the laser beams is continuously advanced by raising the focus position of the laser beams from the lower most point with respect to the optical disk, however, contrary thereto, the focus position of the laser beams can be backed by lowering the same from the upper most point. Likely, the retry focus search from position ahead the position where an out of focus occurs after just focusing can be performed through backing movement by lowering the retry search near from the focus position at the side of the upper most point. Further, in the present embodiment, although the retry focus search signal after just focusing are generated from the search signal generation circuit, the signals can be generated from a separate retry focus search signal generation circuit.

What is claimed is:

1. An optical disk reproducing device which includes a laser beam source which irradiates laser beams onto an optical disk, a photo detector which receives the reflection beams from the optical disk and generates a position error detection signal with respect to a focus position error for the optical disk, a detection circuit which receives the position error detection signal and detects a focus position of the laser beams locating in a range of an automatic focus control loop, and a focus servo device which changes over to the automatic focus control loop in response to the detection signal of the detection circuit and performs an automatic focusing of the laser beams for the optical disk in response to the position error detecting signal, characterized in that, the optical disk reproducing device further comprising, a driver which controls the focus position of the laser beams in response to a driving signal;

a search signal generation means which generates as the driving signal a search signal which continuously advances or backs the focus position of the laser beams with respect to the optical disk;

a memory means which stores the focus position of the laser beams at the moment in response to the detection signal from the detection circuit or a signal output value of the search signal generation means corresponding to the focus position;

a first control circuit which causes the search signal generation means to generate as a retry search signal a drive signal which moves the focus of the laser beams from positions ahead or back to the focus position toward the focus position based on the focus position of the laser beams stored in the memory means or the signal output value stored in the memory means; and, a second control circuit which operates the first control circuit while releasing the automatic focus control loop when the detection signal from the detection circuit is stopped or when the detection signal with respect to the position error moves out from the focus position.

2. An optical disk reproducing device according to claim 1, wherein the photo detector is a tetra-section photo detector in which the sensor area is divided into four sections, the optical disk reproducing device further comprises a focus position error generation circuit which receives signals from the tetra-section photo detector and generates the position error detection signals, wherein the detection circuit generates the detection signals when the position error detection signals are in a zero crossing point and the level thereof is in a predetermined range with respect to the zero crossing point.

3. An optical disk reproducing device according to claim 2, wherein the search signal generation means is provided with a counter which counts clocks and an D/A converter circuit which D/A converts the count value of the counter, the search signals are ramp signals obtained from the D/A converter circuit, and the signal output value of the search signal generation means which is stored in the memory means is the count value of the counter.

4. An optical disk reproducing device according to claim 3, wherein the memory means is a register which receives the detection signals of the detection circuit and stores the count value of the counter at the moment when the detection signals are received and the first control circuit generates the retry signal from the D/A converter circuit through setting the value of the counter based on the value of the register.

5. An optical disk reproducing device according to claim 4, wherein the first control circuit determines a count value which causes the D/A converter circuit to generate a signal for setting a focus at a position corresponding to ahead or back to the focus position based on the value in the counter.

6. An optical disk reproducing device according to claim 5, wherein the second control circuit is a focus controller, and the first control circuit and the focus controller are realized by program processings executed by a MPU.

7. An optical disk reproducing device according to claim 1, wherein the optical disk reproducing device further comprises a pick-up unit which includes the laser beam source, the photo detectors and a focus position adjustment mechanism which adjusts the focusing position from the laser beam source with respect to the optical disk, wherein the driver controls the focusing position of the laser beams via the focus position adjustment mechanism, the detection circuit continuously generates the detection signals so long as the focus position of the laser beams locates in a range of the automatic focus control loop, the search signal generation means includes a counter to count clocks and a D/A converter circuit and generates the search signal of ramp voltage through D/A converting the count value of the counter by the D/A converter circuit, the memory means stores the count value of the counter in response to the detection signals from the detection circuit, the retry search signal causes the focus position of the laser beams to continuously advance with respect to the optical disk from a forward position with a predetermined distance to the focus position or to continuously back with respect to the optical disk from a backward position with a predetermined distance to the focus position based on the count value stored in the memory means.

8. An optical disk reproducing device according to claim 7, wherein the first and second control circuits are constituted as a single control circuit, and the retry search signal is generated from a signal generation means other than the search signal generation means.

* * * * *